United States Patent
Laster (10) Patent No.: US 10,336,425 B2
(45) Date of Patent: Jul. 2, 2019

(54) VARIABLE RATE OF TURN FOR A TROLLING MOTOR

(71) Applicant: NAVICO HOLDINGS AS, Egersund (NO)

(72) Inventor: Matthew Laster, Broken Arrow, OK (US)

(73) Assignee: NAVICO HOLDING AS, Egersund (NO)

( * ) Notice: Subject to any disclaimer, the term of this patent is extended or adjusted under 35 U.S.C. 154(b) by 0 days.

(21) Appl. No.: 15/443,599

(22) Filed: Feb. 27, 2017

(65) Prior Publication Data
US 2018/0244361 A1    Aug. 30, 2018

(51) Int. Cl.
G05D 1/00    (2006.01)
G05D 1/02    (2006.01)
B63H 20/00    (2006.01)
B63H 20/12    (2006.01)
B63H 21/21    (2006.01)
B63H 25/02    (2006.01)

(52) U.S. Cl.
CPC .......... B63H 20/007 (2013.01); B63H 20/12 (2013.01); B63H 21/213 (2013.01); B63H 25/02 (2013.01); G05D 1/0016 (2013.01); G05D 1/0206 (2013.01); B63B 2755/00 (2013.01); B63H 2021/216 (2013.01); B63H 2025/028 (2013.01)

(58) Field of Classification Search
CPC .... B63H 20/007; B63H 25/02; B63H 21/213; B63H 20/12; B63H 2025/028; B63H 2755/00; B63H 2021/216; G05D 1/0206; G05D 1/0016
See application file for complete search history.

(56) References Cited

U.S. PATENT DOCUMENTS 2,877,733 A  *  3/1959  Harris .................. B63H 20/007
                                          114/153
3,807,345 A  *  4/1974  Peterson ................ B63H 21/22
                                          114/153
(Continued)

OTHER PUBLICATIONS

Minn Kota Motors, Johnson Outdoors; "Ultrex i-Pilot GPS" retrieved from https://minnkotamotorsjohnsonoutdoors.com/freshwater-trolling-motors/ultrex?_ga=2.143642230.294804873.1519409882-1038482079. 1519409882 Feb. 27, 2018.

(Continued)

*Primary Examiner* — Russell Frejd
(74) *Attorney, Agent, or Firm* — Nelson Mullins Riley & Scarborough LLP (57) ABSTRACT

Systems, apparatuses, and methods associated with a variable rate of turn trolling motor are provided. An example system includes a trolling motor assembly having a propulsion motor and a steering actuator, a navigation control device having a user input assembly and a processor. The processor may be configured to determine a rate of turn based on user activity detected by the user input assembly and generate a steering input signal. The steering input signal may be an electrical signal indicating a rate of turn. The processor may be further configured to direct the steering actuator, via the steering input signal, to rotate the propulsion motor at a desired rate of turn based on the rate of turn indicated in the steering input signal.

17 Claims, 5 Drawing Sheets

(56) References Cited

U.S. PATENT DOCUMENTS

| | | | | | |
|---|---|---|---|---|---|
| 3,889,625 | A | * | 6/1975 | Roller | B63H 21/265 |
| | | | | | 114/153 |
| 4,008,500 | A | * | 2/1977 | Hall, Jr. | B63B 29/04 |
| | | | | | 114/363 |
| 4,143,436 | A | * | 3/1979 | Jones | B63H 25/10 |
| | | | | | 114/153 |
| 4,565,529 | A | * | 1/1986 | Aertker | B63H 20/007 |
| | | | | | 114/144 E |
| 4,824,408 | A | * | 4/1989 | Aertker | B63H 20/007 |
| | | | | | 114/144 A |
| 5,892,338 | A | * | 4/1999 | Moore | B63H 20/007 |
| | | | | | 318/16 |
| 7,575,491 | B1 | * | 8/2009 | Martin | B63H 21/213 |
| | | | | | 440/6 |
| 2003/0024456 | A1 | * | 2/2003 | Swetish | B63H 20/007 |
| | | | | | 114/144 R |

OTHER PUBLICATIONS

MotorGuide, "The Digital Advantage only from MotorGuide, Never Stop" 2004. Retrieved from <https://minnkotamotors.johnsonoutdoors.com/freshwater-trolling-motors/ultrex?_ga=2.143642230.294804873.1519409882-1038482079.1519409882> Feb. 27, 2018.

Variable Ratio Steering; MotorGuide Trolling Motors; 2012; Retrieved from <http://www.motorguide.com/variable-ratio-steering-technology>.

* cited by examiner

VARIABLE RATE OF TURN FOR A TROLLING MOTOR

FIELD OF THE INVENTION

Embodiments of the present invention relate generally to marine technology and, more particularly, to marine propulsion systems.

BACKGROUND OF THE INVENTION

Trolling motors are often used during fishing or other marine activities. The trolling motors attach to the watercraft and propel the watercraft along a body of water. Often, trolling motors may provide secondary propulsion for precision maneuvering that can be ideal for fishing activities. The trolling motors, however, may also be utilized as the main propulsion system of a watercraft under certain circumstances. Accordingly, trolling motors offer benefits in the areas of ease of use and watercraft maneuverability, among others. That said, further innovation with respect to the operation of trolling motors, particularly in the area of watercraft maneuverability, is desirable.

BRIEF SUMMARY OF THE INVENTION

According to various example embodiments, a system including a trolling motor assembly and a navigation control device is provided for implementing a variable rate of turn steering.

Conventional trolling motor systems employ a constant rate of speed and therefore have poor handling and responsiveness. Various example embodiments described herein are directed to an electronically controlled trolling motor assembly that can employ a variable rate of turn. In this regard, in response to user activity (e.g., through interaction with a navigation control device such as by depressing a foot pedal or pressing a button on a fob) a desired rate of turn of the propulsion system (e.g., the propeller and motor assembly) can be implemented. The rate of turn may be determined by monitoring user activity interfacing with a user input assembly. Further, a steering actuator of a trolling motor may be operated at the desired rate of turn based on that user activity. By employing variable rate of turn features with electronic trolling motors, as described herein, users can experience increased control and maneuverability, particularly when rapid course adjustments are desired.

According to some example embodiments, an example system may be provided. The example system may comprise a trolling motor assembly, a navigation control device, and a processor. The trolling motor assembly may comprise a propulsion motor and a steering actuator. The steering actuator may be variable speed and configured to rotate the propulsion motor in response to an electrical signal. The navigation control device may comprise a user input assembly. The user input assembly may be configured to detect user activity related to controlling navigation of the trolling motor assembly. The processor may be configured to determine a rate of turn based on user activity detected by the user input assembly and generate a steering input signal. The steering input signal may be an electrical signal indicating the rate of turn. The processor may be further configured to direct the steering actuator, via the steering input signal, to rotate the propulsion motor at a desired rate of turn based on the rate of turn indicated in the steering input signal.

According to some example embodiments, an example navigation control device for controlling operation of a trolling motor assembly is provided. The navigation control device may comprise a user input assembly configured to detect user activity related to controlling operation of the trolling motor assembly and a processor. The processor may be configured to determine a rate of turn based on user activity detected by the user input assembly and generate a steering input signal. The steering input signal may be an electrical signal indicating the rate of turn. The processor may be further configured to direct the trolling motor assembly, via the steering input signal, to rotate a direction of propulsion at a desired rate of turn based on the rate of turn indicated in the steering input signal.

According to some example embodiments, an example method for controlling operation of a trolling motor is provided. The example method may comprise detecting user activity at a user input assembly. The user activity may indicate a desire of the user to control operation of the trolling motor. The example method may further comprise determining a rate of turn based on the user activity and generating, by a processor in operable communication with the user input assembly, a steering input signal. The steering input signal may be an electrical signal indicating the rate of turn. The example method may include transmitting the steering input signal to a variable speed electric steering actuator and rotating a direction of propulsion, via a variable speed electric steering actuator, at a desired rate of turn based on the rate of turn indicated in the steering input signal.

BRIEF DESCRIPTION OF THE DRAWINGS

Having thus described some example embodiments in general terms, reference will now be made to the accompanying drawings, which are not necessarily drawn to scale, and wherein:

DETAILED DESCRIPTION

Exemplary embodiments will be described more fully hereinafter with reference to the accompanying drawings, in which some, but not all embodiments of the invention are shown. Indeed, the embodiments take many different forms and should not be construed as being limiting. Rather, these example embodiments are provided so that this disclosure will satisfy applicable legal requirements. Like reference numerals refer to like elements throughout.

Figure 1:
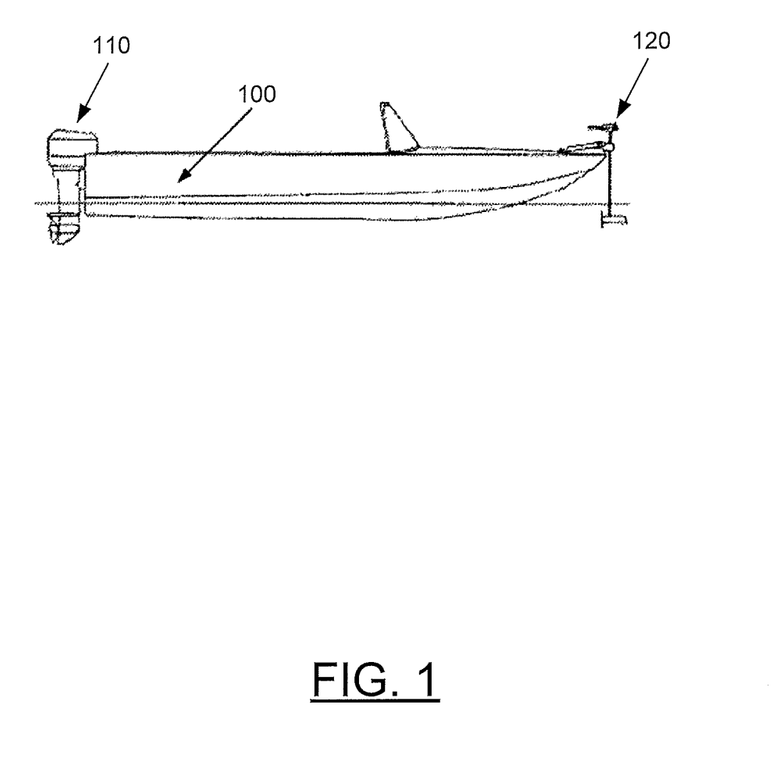
FIG. 1 shows an example watercraft with a trolling motor assembly attached to the bow of the watercraft in accordance with some example embodiments.

FIG. 1 illustrates an example watercraft 100 on a body of water. The watercraft 100 includes a main engine 110 and a trolling motor system 120. According to some example embodiments, the trolling motor system 120 may be comprised of a trolling motor assembly including a propulsion motor and a propeller, and a navigation control device used to control the speed and the course or direction of propulsion. The trolling motor assembly may be attached to the bow of the watercraft 100 and the motor and propeller may be submerged in the body of water. However, positioning of trolling motor system 120 need not be limited to the bow, and may be placed elsewhere on a watercraft. The trolling motor system 120 can be used to propel the watercraft 100 under certain circumstances, such as, when fishing and/or when wanting to remain in a particular location despite the effects of wind and currents on the watercraft 100. Depending on the design, the propeller of a trolling motor assembly may be driven by a gas-powered engine or an electric motor. Moreover, steering the trolling motor system 120 may be accomplished manually via hand control, via foot control, or even through use of a remote control fob. Additionally, in some cases, an autopilot may operate the trolling motor autonomously. While FIG. 1, depicts the trolling motor system 120 as being a secondary propulsion system to the main engine 110, example embodiments described herein contemplate that the trolling motor may be the primary propulsion system for the watercraft 100. Along similar lines, some embodiments of the present invention contemplate use of the variable rate of turn function described herein with other types of motors besides a trolling motor, such as an outboard motor, an inboard motor, an I/O motor, a motor for an unmanned vehicle (air or marine), etc.

Figure 2:
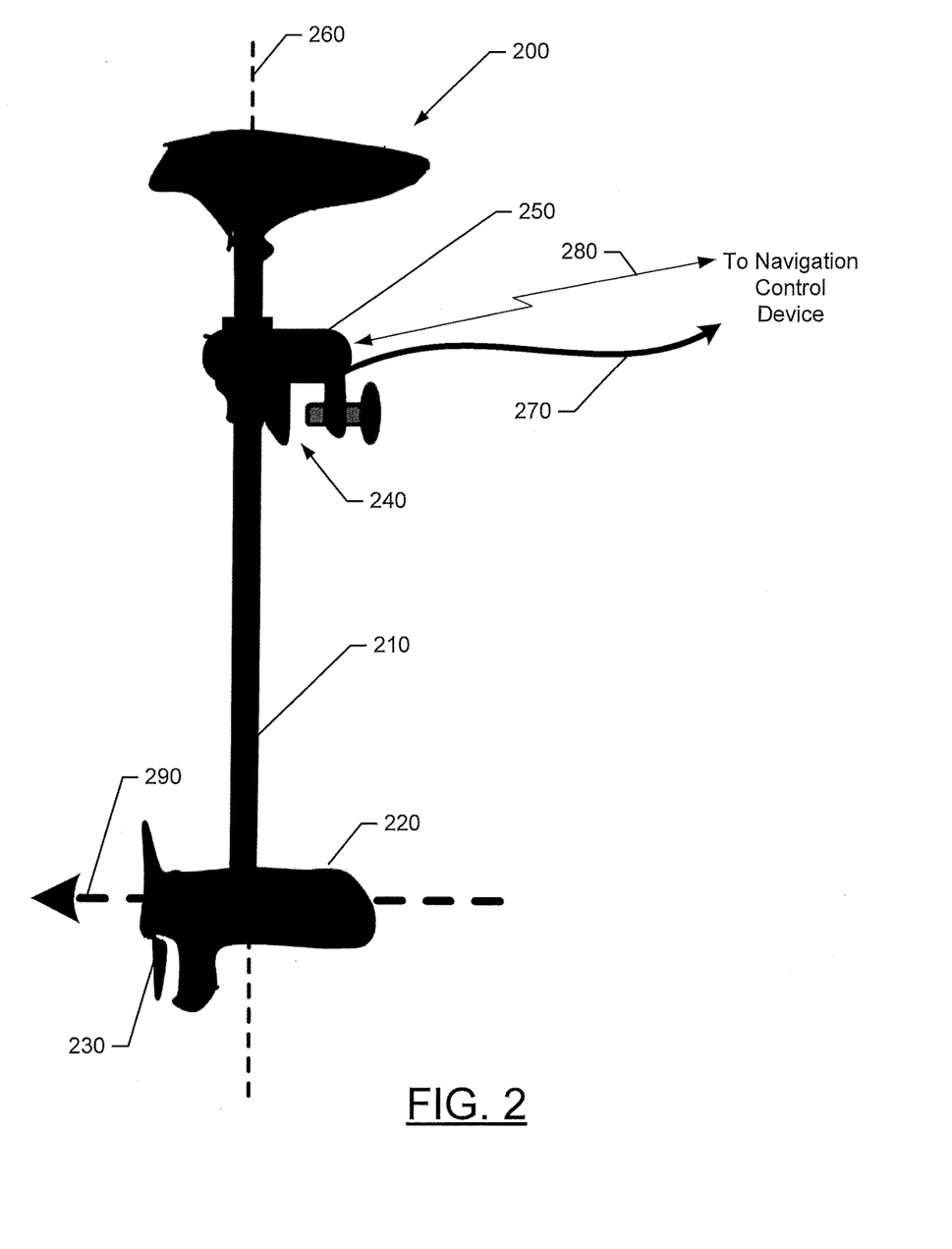
FIG. 2 shows an example trolling motor assembly in accordance with some example embodiments.

FIG. 2 illustrates an example trolling motor assembly 200 according to some example embodiments. The trolling motor assembly 200 may include a shaft 210, a motor 220, a propeller 230, and an attachment device 240. The trolling motor assembly 200 may be affixed to a side of a watercraft via attachment device 240, which may be, for example, an adjustable clamp. According to some example embodiments, the trolling motor assembly 200 may also include other components such as, for example, a sonar transducer assembly and/or other sensors or features (e.g., lights, temperature sensors, etc.).

Further, the trolling motor assembly 200 may include a steering actuator 250 that is configured to actuate to cause rotation of the shaft 210, and accordingly rotation of the propeller 230, about axis 260 to change the direction of propulsion 240. To cause rotation and control of the direction of propulsion 290 (or the direction the trolling motor is oriented, which may correspond to the direction of propulsion when the motor of the trolling motor is operating), the steering actuator 250 may directly rotate the shaft 210 or a series of cam shafts or gears may be employed to cause the rotation. According to some example embodiments, the steering actuator 250 may be an electronically controlled variable speed device that can support differing rates of turn for the direction of propulsion 240 about the axis 260. The steering actuator 250 may be controlled via signals transmitted to the steering actuator 250 from a navigation control device via a wired connection 270 or a wireless connection 280.

Figure 3:
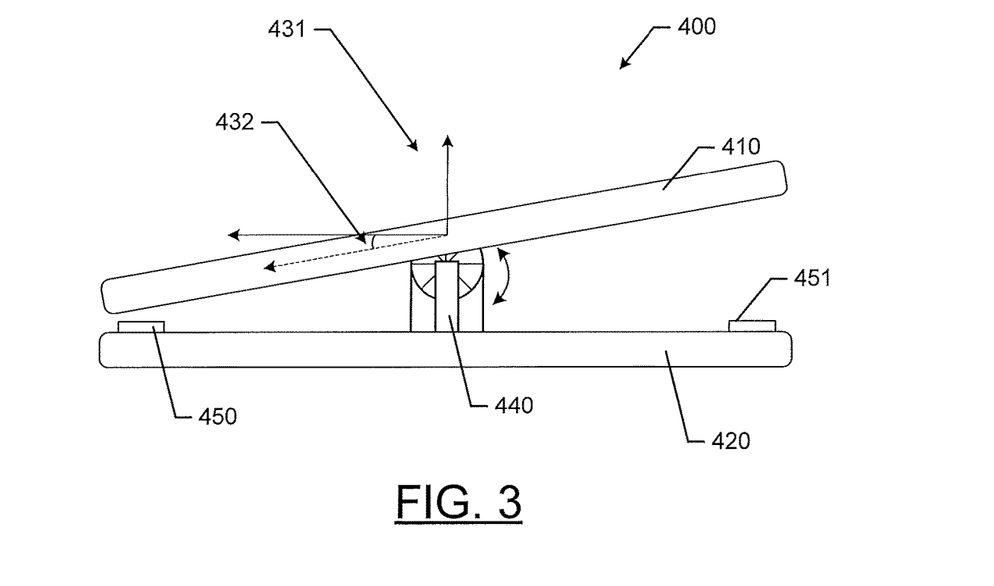
FIG. 3 shows an example navigation control device in the form of a foot pedal assembly in accordance with some example embodiments.

FIG. 3 shows an example implementation of a user input assembly of a navigation control device according to various example embodiments in the form of a foot pedal assembly 400. The foot pedal assembly 400 may be one example of a user input assembly that includes a deflection sensor and a lever. The foot pedal assembly 400 may be in operable communication with the trolling motor assembly 200, via, for example, the processor 335 as described with respect to FIG. 5. Foot pedal assembly 400 includes a lever in the form of a foot pedal 410 that can pivot about an axis (as indicated by the arrows) in response to movement of, for example, a user's foot. The foot pedal assembly 400 further includes a support base 420 and a deflection sensor 440. The deflection sensor 440 may measure the deflection of the foot pedal 410 and provide an indication of the deflection to, for example, processor 335. In some embodiments, a corresponding steering input signal having an indication of a rate of turn may be ultimately provided to a steering actuator (e.g., steering actuator 315 of FIG. 5) via a wired or wireless connection.

According to some example embodiments, the measured deflection of the foot pedal 410 may be an indication of the desired rate of turn for the propulsion direction of a propulsion motor. In this regard, a user may cause the foot pedal 410 to rotate or deflect by an angle 432 (according to example coordinate system 431) and the angle 432 may be measured (e.g., in degrees) by the deflection sensor 440. According to some example embodiments, rotation of the foot pedal 410 in the counterclockwise direction (such that the left side of the foot pedal is tilted down) may cause the propulsion direction to turn to the left at a desired rate of turn, while rotation of the foot pedal 410 in the clockwise direction (such that the right side of the foot pedal is tilted down) may cause the propulsion direction to turn to the right at the desired rate of turn. The rate of turn may be a function of the magnitude of the angle measured by the deflection sensor 440. In this regard, with each increase of an angle of deflection, the rate of turn may also increase, for example, proportionally based on a linear or exponential function. For example, if the foot pedal 410 is deflected by 5 degrees from a given origin, then the rate of turn may be 1 degree of rotation per second for the propulsion direction change. However, if the deflection angle is 10 degrees, the rate of turn may be 5 degrees of rotation per second for the propulsion direction change.

While the foot pedal assembly 400 is shown as including the foot pedal 410 to control the rotation of the propulsion direction, the foot pedal assembly 400 may also include other controls related to operation of the trolling motor assembly 200. For example, propulsion speed controls may also be included on the foot pedal assembly 400.

Figure 4A:
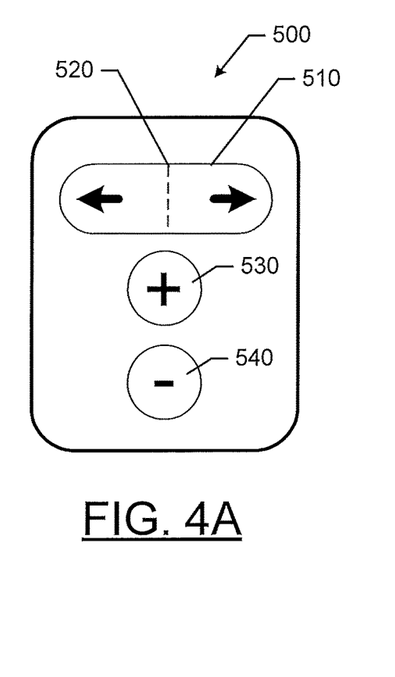
FIGS. 4A and 4B show example navigation control devices in the form of fobs in accordance with some example embodiments.

FIG. 4A provides another example user input assembly that includes a deflection sensor and a lever. Fob 500 may be an embodiment of a navigation control device that includes, for example processor 335 described with respect to FIG. 5. The user input assembly of fob 500 may include rocker button 510 that pivots about axis 520. The rocker button 510 may form the lever of some example embodiments and a deflection of the rocker button 510 may be measured by a deflection sensor (not shown). With respect to operation, a user may depress one side of the rocker button 510 to cause the rocker button 510 to deflect from its origin position. The angle of deflection may be measured by the deflection sensor and communicated to the processor 335 as a rate of turn. As described above, increases in the angle of deflection can result in increased rates of turn.

The user input assembly of fob 500 may also include other controls, such as, propulsion increase button 530 and propulsion decrease button 540. Propulsion increase button 530 and propulsion decrease button 540 may be operated to control the propulsion speed of a propulsion motor.

According to some example embodiments, a change with respect to time in the angle of deflection may alternatively be used to indicate a desired rate of turn. In this regard, if a lever rapidly moves from, for example, an origin position to a given angle of deflection, then the rate of turn would be higher. For example, with respect to the foot pedal assembly 400, if a user was to stomp on the foot pedal 410 to generate a rapid change in the angle of deflection as measured by the deflection sensor 440 with respect to time, then a high rate of turn may be determined by the processor 335. Likewise, if a user slowly changes the angle of deflection, then the processor 335 may determine a lower rate of turn. In a similar fashion, the rate of change of the angle of the deflection of the rocker button 510 may be monitored to determine a rate of turn for provision to a steering actuator. As such, the processor 335 may be configured to determine a rate of turn based on the rate at which and angle of deflection changes with respect to time.

Referring again to FIG. 3, in some embodiments, the foot pedal 410 may include pressure sensors 450 and 451 (e.g., in combination with or as an alternative to deflection sensor 440. Accordingly, as a user depresses the foot pedal 410 onto the pressure sensor, a pressure (or force) may be applied to the sensor and the sensor may measure the pressure. If pressure is applied to element 450, then a rate of turn in a first direction may be determined, and if pressure is applied to the element 451, then a rate of turn in the opposite direction may be determined.

In a similar manner, pressure sensors may be used in conjunction with the fob 500 to measure the pressure applied to either end of the rocker button 510 to determine a rate of turn. Along these lines, the fob 550 shown in FIG. 4B may use pressure sensors to determine a rate of turn. In this regard, fob 550 may be similar to fob 500, with the exception that rather than a rocker button, two separate push buttons 560 and 570 may be included. One or more pressure sensors may be operably coupled to push buttons 560 and 570 to detect an amount of pressure being applied to the buttons. Again, a pressure value may be measured and used to determine a rate of turn by the processor 335. Similar to fob 500, fob 550 may also include a propulsion increase button 580 and propulsion decrease button 590 to control the propulsion speed of the propulsion motor 320.

Figure 4B:
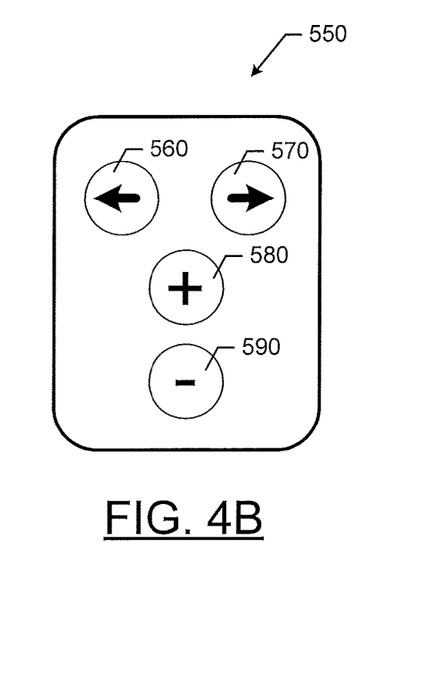

Referring again to FIG. 3, in some embodiments, instead of pressure sensors, elements 450 and 451 may be switches. In such an example embodiment, as a user depresses the foot pedal 410 onto the switch, the switch may transition to an active state. Further, a user may hold the foot pedal 410 in that position for a duration of time. The duration of time may be measured and as it increases, the rate of turn may increase. In other words, holding the foot pedal 410 down longer can cause the rate of turn to increase. In a similar manner, switches may be used in conjunction with the fob 500 and a duration of time in an active state may be measured on either end of the rocker switch 510 to determine a rate of turn. Switches may also be used with fob 550, such as through buttons 560 and 570 in a similar manner.

While the above example embodiments utilize sensors that measure angle of deflection, pressure, and duration of time of pressing, some embodiments of the present invention contemplate other types of sensors for correlating to a desired rate of turn (e.g., capacitive, among others). Additionally, in some embodiments a separate user input could be used to define the rate of turn (e.g., a separate button that could be pressed, toggled, moved, or dialed to define a rate of turn to correspond to the direction of turn indicated by other buttons or levers). Further, while the above example embodiments utilize a foot pedal or fob, some embodiments of the present invention contemplate use with other systems/ structures, such as a touch screen, a user input assembly on the trolling motor or a remote marine electronics device.

Figure 5:
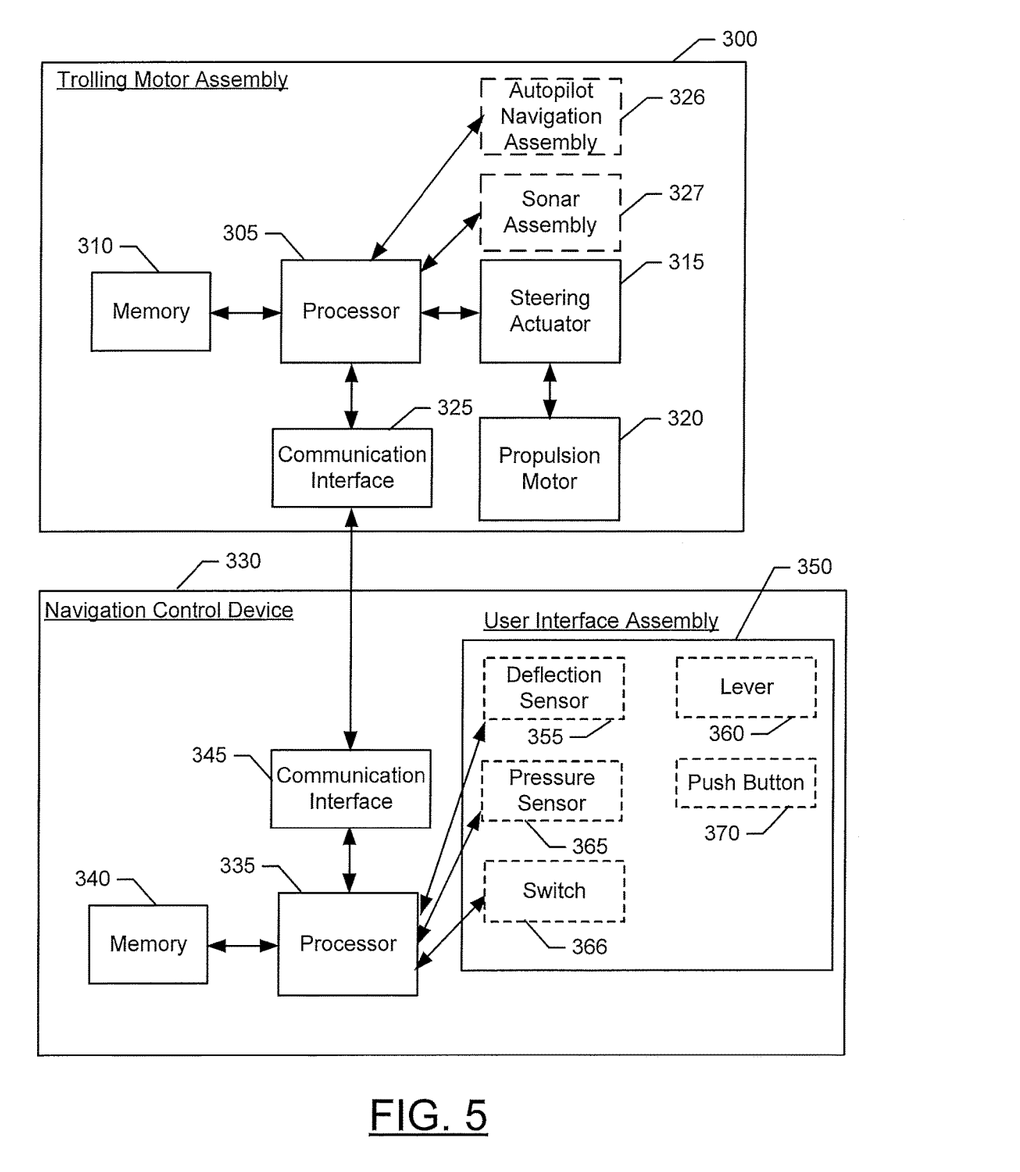
FIG. 5 shows a block diagram of an example trolling motor system in accordance with some example embodiments.

FIG. 5 shows a block diagram of a trolling motor assembly 300 (similar to the trolling motor assembly 200) in communication with a navigation control device 330. As described herein, it is contemplated that while certain components and functionalities of components may be shown and described as being part of the trolling motor assembly 300 or the navigation control device 330, according to some example embodiments, some components (e.g., the autopilot navigation assembly 326, portions of the sonar assembly 327, functionalities of the processors 305 and 335, or the like) may be included in the other of the trolling motor assembly 300 or the navigation control device 330.

As depicted in FIG. 5, the trolling motor assembly 300 may include a processor 305, a memory 310, a steering actuator 315, a propulsion motor 320, and a communication interface 325. According to some example embodiments, the trolling motor assembly 300 may also include an autopilot navigation assembly 326 and a sonar assembly 327.

The processor 305 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 305 as described herein. In this regard, the processor 305 may be configured to analyze electrical signals communicated thereto, for example in the form of a steering input signal received via the communication interface 325, and instruct the steering actuator to rotate the propulsion motor 320 in accordance with a received rate of turn.

The memory 310 may be configured to store instructions, computer program code, trolling motor steering codes and instructions, marine data, such as sonar data, chart data, location/position data, and other data in a non-transitory computer readable medium for use, such as by the processor 305.

The communication interface 325 may be configured to enable connection to external systems (e.g., trolling motor assembly 300). In this manner, the processor 305 may retrieve stored data from remote, external servers via the communication interface 325 in addition to or as an alternative to the memory 310.

The processor 305 may be in communication with and control the steering actuator 315. Steering actuator 315 may be an electronically controlled mechanical actuator (i.e., an electro-mechanical actuator) configured to actuate at various rates (or speeds) in response to respective signals or instructions. As described above with respect to steering actuator 250, steering actuator 315 may be configured to rotate the propulsion motor 320, a rudder, or a direction of propulsion, regardless of the means for doing so, in response to electrical signals. To do so, steering actuator 315 may employ a solenoid, a motor, or the like configured to convert an electrical signal into a mechanical movement. The range of motion to turn the propulsion motor 320 may be 360 degrees, 180 degrees, 90 degrees, 37 degrees, or the like. Further, with respect to being variable speed, the steering actuator 315 may be configured to receive a signal that indicates a rate of turn for the propulsion motor 320 (e.g., 10 degrees/second, 5 degrees/second, or the like) and actuate at a respective rate to support the desired rate of turn for the propulsion direction.

The propulsion motor 320 may be any type of propulsion device configured to urge a watercraft through the water. The propulsion motor 320 may be variable speed to enable the propulsion motor 320 to move the watercraft at different speeds or with different power or thrust.

According to some example embodiments, the autopilot navigation assembly 326 may be configured to determine a destination (e.g., via input by a user) and route for a watercraft and control the steering actuator 315, via the processor 305, to steer the population motor 320 in accordance with the route and destination. In this regard, the processor 305 and memory 310 may be considered components of the autopilot navigation assembly 326 to perform its functionality, but the autopilot navigation assembly 326 may also include position sensors. The memory 310 may store digitized charts and maps to assist with autopilot navigation. To determine a destination and route for a watercraft, the autopilot navigation assembly 326 may employ a position sensor, such as, for example, a global positioning system (GPS) sensor. Based on the route, the autopilot navigation assembly 326 may determine that different rates of turn for propulsion may be needed to efficiently move along the route to the destination. As such, the autopilot navigation assembly 326 may instruct the steering actuator 315, via the processor 305, to turn in accordance with different rates of turn as defined in a planned route. According to some example embodiments, a rate of turn during a route may be a function of, for example, the prevailing winds, ocean currents, weather considerations, or the like at the location of the turn.

The sonar assembly 327 may also be in communication with the processor 305, and the processor 305 may be considered a component of the sonar assembly 327. The sonar assembly 327 may include a sonar transducer that may be affixed to a component of the trolling motor assembly 300 that is disposed underwater when the trolling motor assembly 300 is operating. In this regard, the sonar transducer may be in a housing and configured to gather sonar data from the underwater environment surrounding the watercraft. Accordingly, the processor 305 (such as through execution of computer program code) may be configured to receive sonar data from the sonar transducer, and process the sonar data to generate an image based on the gathered sonar data. In some example embodiments, the sonar assembly 327 may be used to determine depth and bottom topography, detect fish, locate wreckage, etc. Sonar beams, from the sonar transducer, can be transmitted into the underwater environment and echoes can be detected to obtain information about the environment. In this regard, the sonar signals can reflect off objects in the underwater environment (e.g., fish, structure, sea floor bottom, etc.) and return to the transducer, which converts the sonar returns into sonar data that can be used to produce an image of the underwater environment. According to some example embodiments, the trolling motor assembly 300 may include or be in communication with a display to render the image for display to a user.

As mentioned above, the trolling motor assembly 300 may be in communication with a navigation control device 330 that is configured to control the operation of the trolling motor assembly 300. In this regard, the navigation control device 330 may include a processor 335, a memory 340, a communication interface 345, and a user input assembly 350.

The processor 335 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 335 as described herein. In this regard, the processor 335 may be configured to analyze signals from the user input assembly 350 and convey the signals or variants of the signals, via the communication interface 345 to the trolling motor assembly 300 to permit the trolling motor assembly 300 to operate accordingly.

The memory 340 may be configured to store instructions, computer program code, trolling motor steering codes and instructions, marine data, such as sonar data, chart data, location/position data, and other data in a non-transitory computer readable medium for use, such as by the processor 335.

The communication interface 345 may be configured to enable connection to external systems (e.g., communication interface 325). In this manner, the processor 335 may retrieve stored data from a remote, external server via the communication interface 345 in addition to or as an alternative to the memory 340.

Communication interfaces 325 and 345 may be configured to communicate via a number of different communication protocols and layers. For example, the link between the communication interface 325 and communication interface 345 any type of wired or wireless communication link. For example, communications between the interfaces may be conducted via Bluetooth, Ethernet, the NMEA 2000 framework, cellular, WiFi, or other suitable networks.

According to various example embodiments, the processor 335 may operate on behalf of both the trolling motor assembly 300 and the navigation control device 330. In this regard, processor 335 may be configured to perform some or all of the functions described with respect to processor 305 and processor 335 may communicate directly to the autopilot navigation assembly 326, the sonar assembly 327, or the steering actuator 315 directly via a wired or wireless communication.

The processor 335 may also interface with the user input assembly 350 to obtain information including a rate of turn based on user activity that are one or more inputs to the user input assembly 350. In this regard, the processor 335 may be configured to determine a rate of turn based on user activity detected by the user input assembly 350, and generate a steering input signal. The steering input signal may be an electrical signal indicating the rate of turn. Further, the processor 335 may be configured to direct the steering actuator 315, directly or indirectly, to rotate the propulsion motor 320 at a desired rate of turn based on the rate of turn indicated in the steering input signal. According to some example embodiments, the processor 335 may be further configured to modify the rate of turn indicated in the steering input signal to different values based on variations in the user activity detected by the user input assembly 350.

Various example embodiments of a user input assembly 350 may be utilized to detect the user activity and facilitate generation of a steering input signal indicating a rate of turn. To do so, various sensors including feedback sensors, and mechanical devices that interface with the sensors, may be utilized. For example, a deflection sensor 355, a pressure sensor 365, or a switch 366 may be utilized as sensors to detect user activity with respect to a rate of turn. Further, lever 360 and push button 370 may be mechanical devices that are operably coupled to a sensor and may interface directly with a user to facilitate inputting a rate of turn by the user via the user input assembly 350.

According to some example embodiments, a deflection sensor 355 and a lever 360 may be utilized as the user input assembly 350. The deflection sensor 355 may be any type of sensor that can measure an angle of deflection of an object, for example, a lever 360 from a center or zero position. In this regard, the processor 335 may be configured to determine a desired rate of turn of the propulsion direction based on an angle of deflection (e.g., from a set point or origin) of the lever 360 measured by the deflection sensor 355. For example, as a user increases the angle of deflection, for example, from an origin, a rate of turn for the direction of propulsion may also increase thereby implementing a variable rate of turn for the propulsion direction. In other words, for example, as the angle of deflection increases, rotation of the propulsion direction will accelerate.

According to some embodiments, rather than using techniques that measure an angle of deflection, a pressure sensor 365 may be used in conjunction with, for example, either the lever 360 or a push button 370 to determine a rate of turn. In this regard, the pressure sensor 365 may be configured to detect an amount of pressure applied on the pressure sensor by a user and provide a pressure value to the processor 335 based on the detected amount of pressure. In turn, the processor 335 may be configured to determine a rate of turn based on the pressure value. According to some example embodiments, higher detected amounts of pressure may indicate a higher rate of turn. The rate of turn may have a linear or exponential relationship to the pressure value.

According to some example embodiments, a rate of turn may be alternatively be determined based on a duration of time that a switch, such as switch 366, is in an active position. In this regard, switch 366 may have two states an active state (e.g., "on") and an inactive state (e.g., "off"). According to some example embodiments, switch 366 may normally be in the inactive state and user activity, such as actuation of the lever 360 or the push button 370, may be required to place the switch 366 in the active state. When in the active state, a duration of time in the active state may be detected and the rate of turn may be a function of the duration of time that the switch 366 is in the active state.

Figure 6:
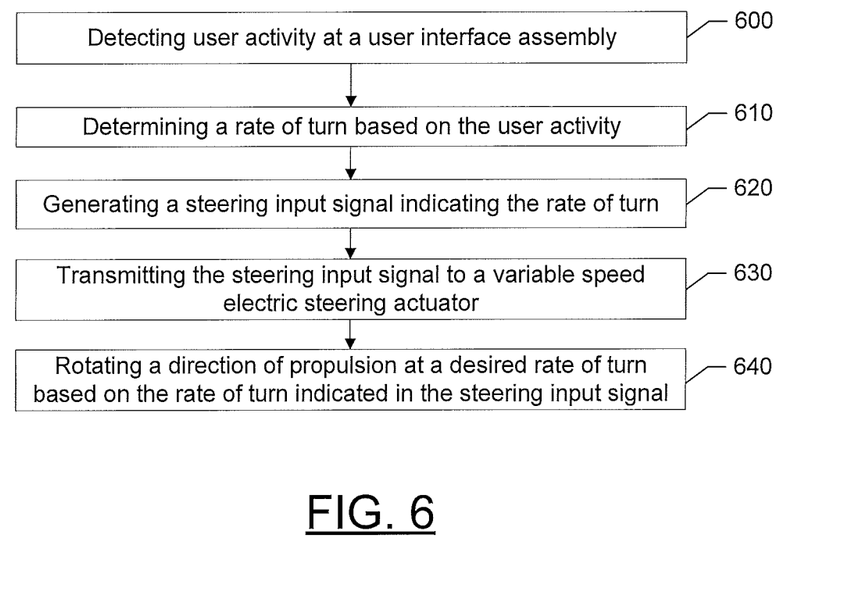
FIG. 6 shows a flow chart of an example method for controlling operation of a trolling motor in accordance with some example embodiments.

Example embodiments also include methods of controlling operation of a trolling motor assembly as shown in FIG. 6 and in the associated description. In this regard, FIG. 6 illustrates a flowchart of various operations that may, for example, be performed by, with the assistance of, or under the control of one or more of the processor 335 or 305, or with other associated components described with respect to FIG. 5 or otherwise herein and these components may therefore constitute means for performing the respective operations.

In this regard, the example method may include detecting user activity at a user input assembly at 600. According to some example embodiments, detecting user activity may include detecting an angle of deflection of a lever (e.g., a foot pedal or a rocker button), detecting a rate at which an angle of deflection of a lever changes with respect to time, detecting a switch being in an active state, detecting an amount of pressure on a pressure sensor, or the like. At 610, the example method may include determining a rate of turn based on the user activity. In this regard, determining the rate of turn may include determining a rate of turn based on an angle of deflection of a lever, a rate at which an angle of deflection of a lever changes with respect to time, a duration of time that a switch is in an active state, an amount of pressure on a pressure sensor, or the like. Further, at 620, the example method may include generating, by a processor in operable communication with the user input assembly, a steering input signal. In this regard, the steering input signal may be an electrical signal indicating the rate of turn. The example method may include, at 630, transmitting the steering input signal to a variable speed electric steering actuator, and, at 640, rotating a direction of propulsion, via the variable speed electric steering actuator, at a desired rate of turn based on the rate of turn indicated in the steering input signal. According to some example embodiments, the example method may further include modifying the rate of turn indicated in the steering input signal to different values based on variations in the user activity detected by the user input assembly.

FIG. 6 and the associated description illustrates a collection of operations of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 310 or 340 and executed by, for example, the processor 305 or 335. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a, computer or other programmable device to cause a series of operations to be performed on the computer or other programmable apparatus to produce a computer-implemented process such that the instructions which execute on the computer or other programmable apparatus implement the functions specified in the flowchart block(s).

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A system comprising:
a trolling motor assembly comprising a propulsion motor and a steering actuator, wherein the steering actuator is variable speed and configured to rotate directional alignment of the propulsion motor at a rate of turn in response to an electrical signal;
a navigation control device comprising a user input assembly, wherein the user input assembly is configured to detect user activity related to controlling navigation of the trolling motor assembly, wherein the user input assembly of the navigation control device includes a lever; and
a processor, the processor configured to:
determine a desired rate of turn for the directional alignment of the propulsion motor based on an angle of deflection of the lever corresponding to user activity detected by the user input assembly;
generate a steering input signal, the steering input signal being an electrical signal indicating the desired rate of turn; and
direct the steering actuator, via the steering input signal, to rotate the directional alignment of the propulsion motor at the desired rate of turn.

2. The system of claim 1, wherein the processor is further configured to modify the desired rate of turn indicated in the steering input signal to different values based on variations in the user activity detected by the user input assembly.

3. The system of claim 1, wherein the lever comprises a foot pedal.

4. The system of claim 1, wherein the user input assembly of the navigation control device includes a pressure sensor, wherein the pressure sensor is configured to detect an amount of pressure applied on the pressure sensor by a user and provide a pressure value based on the detected amount of pressure; and
wherein the processor is further configured to determine the desired rate of turn based on the pressure value.

5. The system of claim 1, wherein the user input assembly includes a switch; and
wherein the processor is further configured to determine the desired rate of turn based on a duration of time that the switch is in an active state.

6. The system of claim 1,
wherein the processor is further configured to determine the desired rate of turn based on a rate at which the angle of deflection of the lever changes with respect to time.

7. The system of claim 1, wherein the processor is configured to direct the steering actuator to rotate the direction of the propulsion motor via wireless communication.

8. A navigation control device for controlling operation of a trolling motor assembly, the navigation control device comprising:
a user input assembly configured to detect user activity related to controlling operation of the trolling motor assembly, wherein the user input assembly of the navigation control device includes a lever; and
a processor, the processor configured to:
determine a desired rate of turn for rotating directional alignment of the trolling motor assembly based on an angle of deflection of the lever corresponding to user activity detected by the user input assembly;
generate a steering input signal, the steering input signal being an electrical signal indicating the desired rate of turn; and
direct the trolling motor assembly, via the steering input signal, to rotate a direction of propulsion at the desired rate of turn.

9. The navigation control device of claim 8, wherein the processor is further configured to modify the desired rate of turn indicated in the steering input signal to different values based on variations in the user activity detected by the user input assembly.

10. The navigation control device of claim 8, wherein the lever comprises a foot pedal.

11. The navigation control device of claim 8, wherein the user input assembly of the navigation control device includes a pressure sensor, wherein the pressure sensor is configured to detect an amount of pressure applied on the pressure sensor by a user and provide a pressure value based on the detected amount of pressure; and
wherein the processor is further configured to determine the desired rate of turn based on the pressure value.

12. The navigation control device of claim 8, wherein the user input assembly includes a switch; and
wherein the processor is further configured to determine the desired rate of turn based on a duration of time that the switch is in an active state.

13. The navigation control device of claim 8, wherein the user input assembly of the navigation control device includes a lever; and
wherein the processor is further configured to determine the desired rate of turn based on a rate at which the angle of deflection of the lever changes with respect to time.

14. The navigation control device of claim 8, wherein the processor is configured to direct the trolling motor assembly to rotate the direction of propulsion via a wireless communication.

15. A method for controlling operation of a trolling motor, the method comprising:
detecting user activity at a user input assembly, wherein the user activity indicates a desire of the user to control operation of the trolling motor, wherein the user input assembly includes a lever;
determining a desired rate of turn for rotating directional alignment of the trolling motor based on an angle of deflection of the lever corresponding to the user activity;
generating, by a processor in operable communication with the user input assembly, a steering input signal, wherein the steering input signal is an electrical signal indicating the desired rate of turn;
transmitting the steering input signal to a variable speed electric steering actuator; and
rotating a direction of propulsion, via a variable speed electric steering actuator, at the desired rate of turn.

16. The method of claim 15, further comprising modifying the desired rate of turn indicated in the steering input signal to different values based on variations in the user activity detected by the user input assembly.

17. The method of claim 15, wherein detecting the user activity includes detecting a switch being in an active state; and
wherein determining the rate of turn includes determining the desired rate of turn based on a duration of time that the switch is in the active state.

* * * * *

UNITED STATES PATENT AND TRADEMARK OFFICE
CERTIFICATE OF CORRECTION

PATENT NO. : 10,336,425 B2  
APPLICATION NO. : 15/443599  
DATED : July 2, 2019  
INVENTOR(S) : Matthew Laster

Page 1 of 1

It is certified that error appears in the above-identified patent and that said Letters Patent is hereby corrected as shown below:

On the Title Page (71) Applicant: NAVICO HOLDINGS AS, Egersund (NO)  
Should read as:  
-- (71) Applicant: NAVICO HOLDING AS, Egersund (NO) --

Signed and Sealed this  
Third Day of September, 2019

Andrei Iancu  
*Director of the United States Patent and Trademark Office*